United States Patent [19]

Scanlon et al.

[11] Patent Number: 5,795,358
[45] Date of Patent: Aug. 18, 1998

[54] REMOVEABLE DEFLECTOR BOOT FOR A WET/DRY VACUUM CLEANER

[75] Inventors: John J. Scanlon, Wilmington, Del.; Jay J. Herring, Landenberg, Pa.; Richard W. Giannetta, Elkton, Md.

[73] Assignee: W. L. Gore & Associates, Inc., Newark, Del.

[21] Appl. No.: 887,363

[22] Filed: Jul. 2, 1997

Related U.S. Application Data

[63] Continuation of Ser. No. 699,429, Aug. 19, 1996, abandoned.

[51] Int. Cl.⁶ .................................................. B01D 45/08
[52] U.S. Cl. ........................... 55/320; 55/436; 55/447; 55/DIG. 3
[58] Field of Search ........................... 55/320, 327, 334, 55/374, 418, 436, 447, 472, 473, DIG. 3; 15/344, 353; 62/238.1; 285/161

[56] References Cited

U.S. PATENT DOCUMENTS

| | | |
|---|---|---|
| 3,732,667 | 5/1973 | Fromknecht et al. ............. 55/DIG. 3 |
| 3,820,310 | 6/1974 | Fromknecht et al. ............. 55/DIG. 3 |
| 3,909,219 | 9/1975 | Fromknecht ....................... 55/DIG. 3 |
| 4,142,270 | 3/1979 | Nauta . |
| 4,183,116 | 1/1980 | Thompson . |
| 4,341,540 | 7/1982 | Howerin . |
| 4,463,474 | 8/1984 | Jacobs . |
| 4,693,734 | 9/1987 | Erickson, Jr. . |
| 4,899,418 | 2/1990 | Steiner et al. ..................... 15/344 |
| 5,030,257 | 7/1991 | Kasper et al. . |
| 5,129,684 | 7/1992 | Lawrence et al. ................ 285/161 |
| 5,263,225 | 11/1993 | Winters . |
| 5,378,354 | 1/1995 | Poor . |
| 5,606,865 | 3/1997 | Caron ................................ 62/238.1 |

*Primary Examiner*—Jay H. Woo
*Assistant Examiner*—Minh-Chau T. Pham
*Attorney, Agent, or Firm*—Victor M. Genco, Jr.; Carol A. Lewis White

[57] ABSTRACT

A wet/dry vacuum cleaner in one commonly available configuration includes a canister having an interior region defining a chamber, a motor mounted on the canister, a filter mounted on the canister and disposed within the chamber, and an inlet fitting attached to the canister. The inlet fitting is positioned generally adjacent the filter which results in the flow of air or water carrying debris generally towards the filter. The present invention is directed to a deflector boot which is secured to the inlet fitting for deflecting the flow of air or water carrying debris away from the filter. The deflector boot includes a cylindrical wall having an open end at one end thereof and an end wall that encloses the opposite end of the cylindrical wall. The open end of the cylindrical wall is sized to fit snugly over the inlet fitting when attaching the boot to the fitting. There is an opening formed in the cylindrical wall so that the flow of air or water carrying debris engages the end wall before falling out of the boot through the opening away from the filter.

3 Claims, 4 Drawing Sheets

REMOVEABLE DEFLECTOR BOOT FOR A WET/DRY VACUUM CLEANER

This application is a continuation of application Ser. No. 08/699,429, filed Aug. 19, 1996, now abandoned.

FIELD OF THE INVENTION

This invention generally relates to wet/dry vacuum cleaners. More particularly, the present invention relates to a new deflector boot which is applied on an existing wet/dry vacuum cleaner for deflecting flow of dirt-laden material away from a filter of the vacuum cleaner.

BACKGROUND OF THE INVENTION

Referring to FIG. 1, there is generally indicated at 10 a wet/dry vacuum cleaner. As shown, the vacuum cleaner 10 comprises a generally cylindrical canister, generally indicated at 12, and a hose 14 for drawing air or water carrying debris into the canister 12. The vacuum cleaner 10 further includes a motor 16 and a filter 18 suitably housed by the canister 12. The canister 12 has an opening (not designated) formed therein for receiving an inlet fitting, generally indicated at 20, which is connected to the hose 14 at one end thereof. The inlet fitting 20 is designed to deliver debris and other particles drawn from the hose 14 into a chamber 22 defined by the canister when operating the vacuum cleaner 10. As shown, the inlet fitting 20 provided on the illustrated vacuum cleaner 10 has a body 24 with an opening 26 formed therein which partially directs the flow towards the filter 18. This results in debris, along with the air or water carrying the same, impacting the filter surface at a relatively high velocity which significantly reduces the efficiency of the filter 18. Over time, the filter 18 eventually becomes abraded and fails.

To date, there are approximately fifteen million wet/dry vacuums in the market place which are constructed similarly to cleaner 10. Each vacuum cleaner having the inlet fitting 20 which directs the debris towards the filter 18 experiences unnecessary wear and tear of the filter. There is presently a need in the wet/dry vacuum cleaner art for a means for deflecting the debris away from the filter 18 for increasing the life of the filter and the overall life of the vacuum cleaner 10.

The foregoing illustrates limitations known to exist in present wet/dry vacuum cleaners. Thus, it is apparent that it would be advantageous to provide a means for overcoming one or more of the limitations set forth above. Accordingly, a suitable alternative is provided including features more fully disclosed hereinafter.

SUMMARY OF THE INVENTION

The present invention advances the art of wet/dry vacuum cleaners beyond which is known to date. In one aspect of the present invention, a wet/dry vacuum cleaner in one well-known embodiment comprises a canister having an interior region defining a chamber, a motor mounted on the canister, a filter mounted on the canister and disposed within the chamber, and an inlet fitting attached to the canister, the inlet fitting being positioned generally adjacent the filter which results in the flow of air or water carrying debris being directed generally towards the filter. The present invention involves providing a deflector boot which is secured to the inlet fitting for deflecting the flow of air or water carrying debris away from the filter.

More specifically, the deflector boot comprises a cylindrical wall having an open end at one end thereof and an end wall that encloses the opposite end of the cylindrical wall. The open end of the cylindrical wall is sized to fit snugly over the inlet fitting. There is an opening formed in the cylindrical wall so that the flow of air or water carrying debris engages the end wall before falling out of the boot through the opening away from the filter. Preferably, the deflector boot is fabricated from a resilient or flexible material.

Accordingly, an object of the present invention is to provide a deflector boot for a wet/dry vacuum cleaner which is capable of deflecting debris and other undesirable effects away from a filter of the vacuum cleaner.

Another object of the present invention is to provide a deflector boot which can be easily retrofitted onto an existing vacuum cleaner without having to use fasteners or tools.

A further object of the present invention is to provide a deflector boot that improves the filtration efficiency of a vacuum cleaner filter by reducing the debris velocity.

A further object of the present invention is to provide a deflector boot which is fabricated from a durable material for long time use.

Yet another object of the present invention is that of a deflector boot which extends the life of the vacuum cleaner upon which it is mounted.

BRIEF DESCRIPTION OF THE DRAWINGS

The foregoing summary, as well as the following detailed description of a preferred embodiment of the present invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 2:
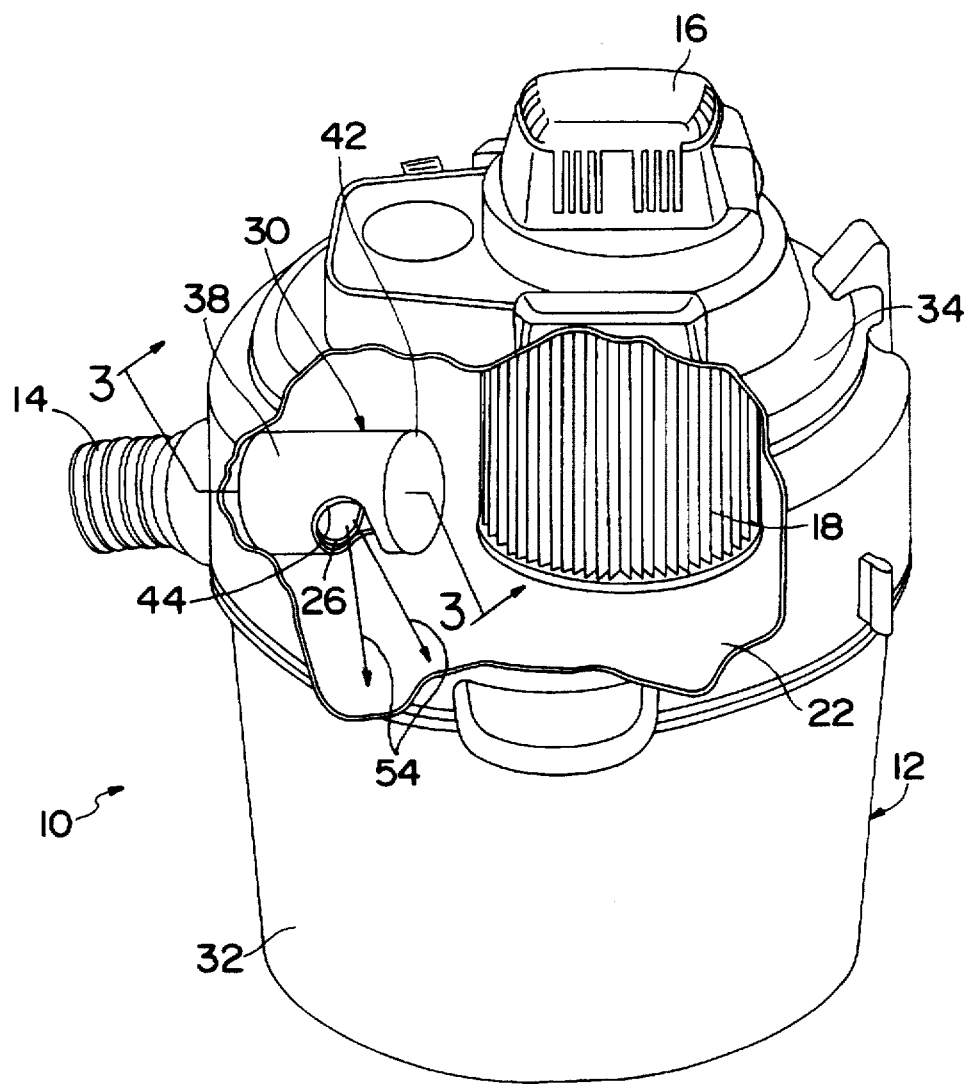
FIG. 2 is a perspective view of the vacuum cleaner having a deflector boot of the present invention mounted on the inlet fitting.

Referring now to the drawings, wherein similar reference characters designate corresponding parts throughout the several views, a deflector boot of the present invention is generally illustrated at 30 in FIG. 2. As shown in FIG. 2, the deflector boot 30 is designed for use with vacuum cleaner 10 for deflecting the flow of air or water carrying debris and other particulate matter away from the filter 18 disposed within the chamber 22 of the canister 12.

Figure 1:
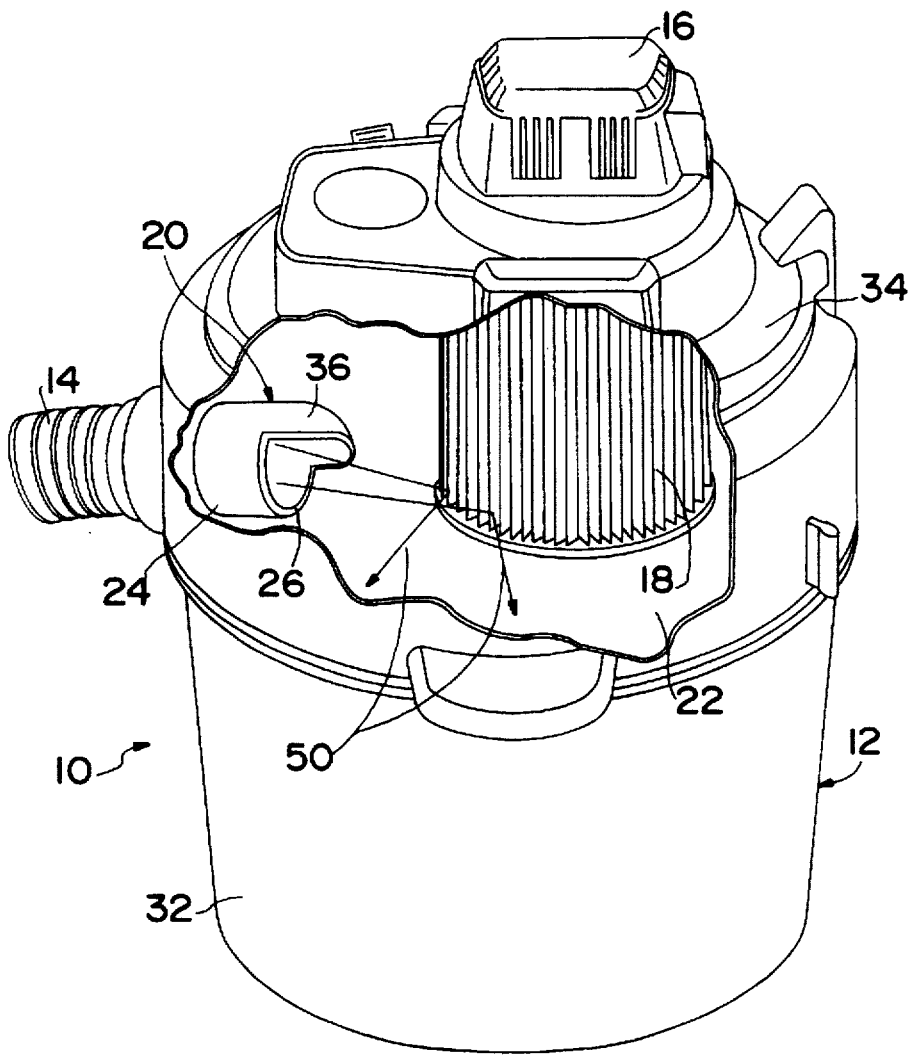
FIG. 1 is a perspective view of a typical wet/dry vacuum cleaner having a prior art inlet fitting mounted thereon.

More particularly, the canister 12 is fabricated from two separate parts, namely, a bottom canister section 32 and a top cover section 34 which is suitably attached to the bottom section. When assembled, the cover section 34 is sealed with respect to the bottom section 32 in the well-known manner. The motor 16 and filter 18 are secured to the cover section 34 in any suitable fashion. FIGS. 1 and 2 clearly illustrate these components of the vacuum cleaner 10, and their interrelation with one another.

The inlet fitting 20, which is provided within the inlet opening of the vacuum cleaner from the factory, includes the cylindrical body 24 which is received within the inlet opening formed in the canister, and a spherically-shaped end section 36 having the opening 26. The opening 26 is formed by eliminating one-half of the spherical end section 36 which results in the flow of air or water being drawn into the chamber of the canister along the axis (not designated) of the cylindrical body 24 and being subsequently directed towards the filter 18. The end section 36 is inadequate in deflecting the flow of air or water away from the filter 18.

FIG. 1 illustrates the manner in which the flow of air and/or water carrying debris is drawn into the chamber 22 of the canister 12 through the inlet fitting 20. As discussed in greater detail above, the result of debris impacting the filter 18 at a relatively high velocity significantly reduces the efficiency of the filter, and, over time, necessitates the replacement of the filter. Even though the opening 26 of the inlet fitting 20 is directed towards the bottom of the chamber 22 of the canister 12, debris is still directed towards the filter 18.

Figure 4:
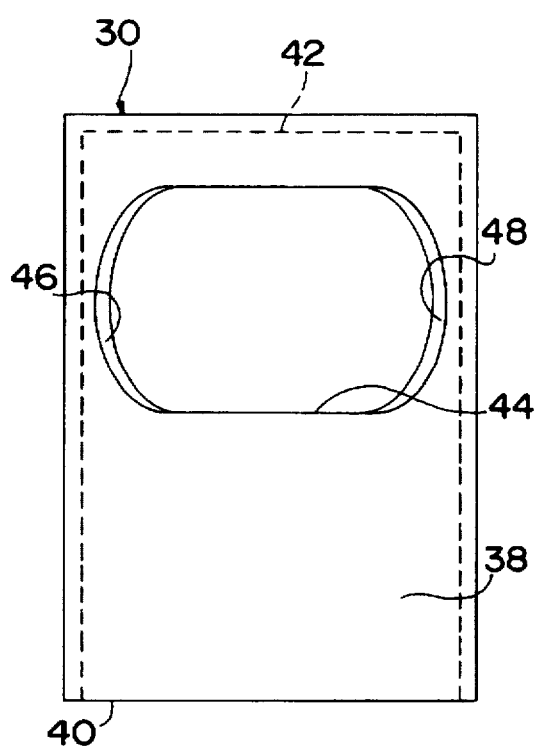
FIG. 4 is a front elevational view of the deflector boot.
Figure 5:
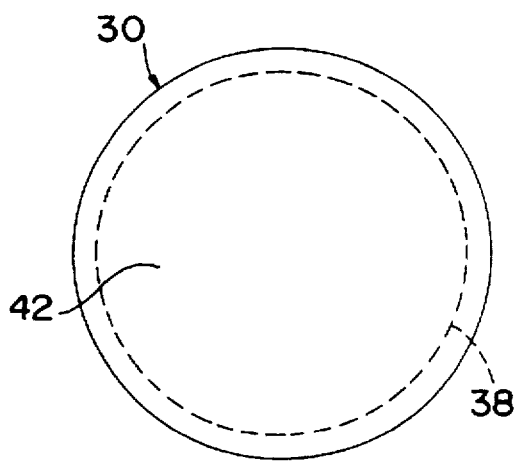
FIG. 5 is a top plan view thereof.
Figure 6:
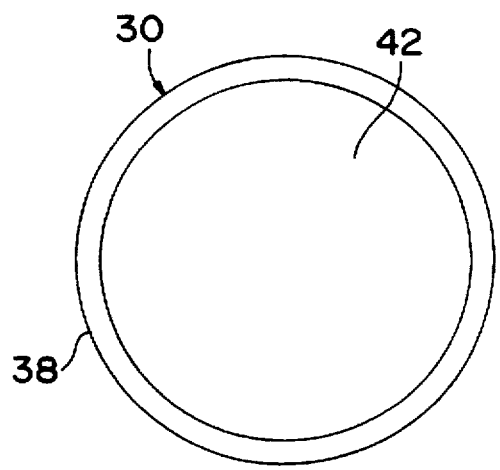
FIG. 6 is a bottom plan view thereof.

Referring to FIGS. 4 through 6, the deflector boot 30 of the present invention comprises a thin, flexible cylindrical wall 38 having an open end 40 at its lower end (FIG. 4). An end wall 42 is provided at the upper end (FIG. 4) of the cylindrical wall 38 for closing that end of the deflector boot 30. Formed in the cylindrical wall 38, adjacent the end wall 42, is an oval-shaped opening 44. As illustrated in FIG. 4, the opening 44 has left- and right-hand lateral edges 46, 48, respectively, which substantially span about one-half the circumference of the cylindrical wall 38. Thus, the opening 44 is large enough so that the flow of air or water carrying relatively large particles of debris can exit the boot 30 during use of the vacuum cleaner 10.

As mentioned above, the cylindrical wall 38 and the integrally formed end wall 42 are fabricated from a flexible or resilient, or elastomeric material which enables the cylindrical wall to fit snugly over the inlet fitting 20 of the vacuum cleaner 10. The inner diameter of the cylindrical wall 38 is slightly less than the outer diameter of the cylindrical body 24 of the inlet fitting 20 for ensuring that the deflector boot 30 is stretched over the inlet fitting and securely attached thereto. Preferably, the opening 44 of the deflector boot 30 is aligned with the opening 26 of the inlet fitting 20 so that the flow of fluid from the hose 14 to the chamber 22 of the canister 12 is not restricted by the inlet fitting. This alignment of the inlet fitting opening 26 and deflector boot opening 44 is illustrated in FIGS. 2 and 3.

The following is a description of the installation of the deflector boot 30 on the vacuum cleaner 10. As illustrated in FIG. 1, the existing inlet fitting 20 directs the flow of air or water carrying debris and other particles flowing through the hose 14 of the wet/dry vacuum cleaner 10 towards the filter 18 as represented by arrows 50. The debris, upon impacting the filter 18 oftentimes fall harmlessly to the bottom of the canister 12, or adhere to the filter. In either situation, damage is caused to the filter 18 when the debris impacts the filter.

Figure 3:
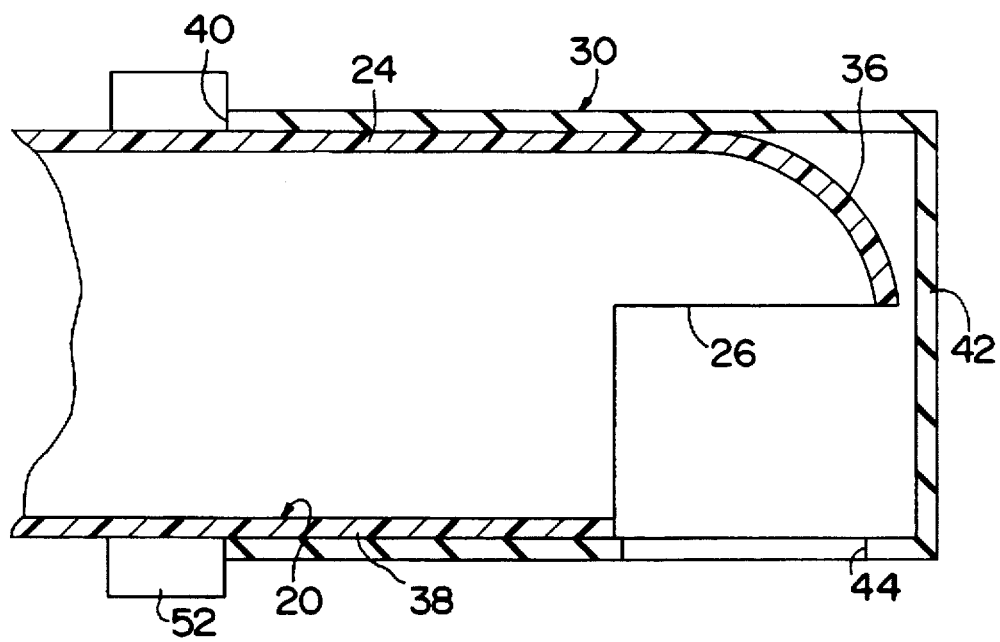
FIG. 3 is a cross-sectional view taken along line 3—3 of FIG. 2.

In order to prevent damage to the filter 18 from occurring, the deflector boot 30 is secured to the inlet fitting 20 in the manner shown in FIGS. 2 and 3. Prior to the installation of the deflector boot 30 on the inlet fitting 20 of the vacuum cleaner 10, the inlet fitting should be cleaned to remove any dust and other debris from the fitting. This can be accomplished by using a wet towel. After cleaning the inlet fitting 20, the open end 40 of the deflector boot 30 is stretched radially outwardly and slid over the end section 36 of the inlet fitting, and over the body 24 until the end 40 of the deflector boot 30 abuts a flange identified by reference number 52 in FIG. 3. It is important that when sliding the deflector boot 30 over the fitting 20 that the opening 44 of the deflector boot is aligned with the opening 26 of the inlet fitting 20. Once secured in the fashion shown in FIG. 3, the vacuum cleaner 10 is ready for use.

During use, as air or water carrying debris and other like particles flow from the hose 14 into the canister 12 via the inlet fitting 20, the flow impacts the end wall 42 of the deflector boot 30. Once impacted, the air or water is deflected to flow through the openings 26, 44 of the inlet fitting 20 and deflector boot 30, respectively, towards the bottom or side portions of the canister 12. Arrows 54 in FIG. 2 represent the flow of air or water from the hose 14 into the canister 12. As shown, the flow is directed away from the filter 18 thereby keeping the filter free from damage caused by the impact of air, water and debris on the filter.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. In a wet/dry vacuum cleaner including a canister having an interior region defining a chamber, a motor mounted on the canister, a filter mounted on the canister and disposed within the chamber, and an inlet fitting attached to the canister, said inlet fitting being positioned adjacent the filter wherein particles of debris flow through the inlet fitting and into the chamber of the canister generally towards the filter, the improvement comprising: a resilient, removable deflector boot secured to the inlet fitting for deflecting said particles of debris away from the filter, said deflector boot having a cylindrical wall having an open end at one end thereof and an end wall that encloses an opposing end of the cylindrical wall, said cylindrical wall having an opening formed therein, said open end of the cylindrical wall being sized for stretching over the inlet fitting to releasably secure the deflector boot to the inlet fitting.

2. A deflector boot as set forth in claim 1, said cylindrical wall being fabricated from an elastomeric material.

3. A deflector boot as set forth in claim 1, said opening having spaced apart lateral edges which span generally on half the circumference of the cylindrical wall.

* * * * *